(12) United States Patent
Cardona et al.

(10) Patent No.: US 8,935,329 B2
(45) Date of Patent: Jan. 13, 2015

(54) MANAGING MESSAGE TRANSMISSION AND RECEPTION

(75) Inventors: Omar Cardona, Cedar Park, TX (US);
Chidambar Y. Kulkarni, Bangalore (IN); Vishal R. Mansur, Hubli (IN);
Matthew R. Ochs, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 13/348,629

(22) Filed: Jan. 11, 2012

(65) Prior Publication Data
US 2013/0179505 A1    Jul. 11, 2013

(51) Int. Cl.
    *G06F 15/16* (2006.01)
(52) U.S. Cl.
    USPC ............... 709/204; 714/56; 710/22
(58) Field of Classification Search
    USPC ............... 709/204; 714/56; 710/22
    See application file for complete search history.

(56) References Cited

U.S. PATENT DOCUMENTS

| | | | |
|---|---|---|---|
| 5,619,647 A | 4/1997 | Jardine | |
| 5,708,779 A | 1/1998 | Graziano et al. | |
| 5,822,300 A | 10/1998 | Johnson et al. | |
| 5,870,627 A * | 2/1999 | O'Toole et al. | 710/22 |
| 6,473,780 B1 * | 10/2002 | Barcelo | 718/103 |
| 6,741,559 B1 | 5/2004 | Smeulders et al. | |
| 6,954,427 B1 | 10/2005 | Viswanath et al. | |
| 6,956,818 B1 | 10/2005 | Thodiyil | |
| 6,963,536 B1 | 11/2005 | Tzeng et al. | |
| 7,283,470 B1 | 10/2007 | Sindhu et al. | |
| 7,553,154 B2 * | 6/2009 | Jones | 431/288 |
| 7,808,913 B2 * | 10/2010 | Ansari et al. | 370/241 |
| 7,929,442 B2 | 4/2011 | Connor et al. | |
| 7,930,444 B2 * | 4/2011 | Shasha et al. | 710/22 |
| 2007/0070901 A1 | 3/2007 | Aloni et al. | |
| 2007/0162637 A1 * | 7/2007 | Mirabeau et al. | 710/22 |
| 2009/0016217 A1 * | 1/2009 | Kashyap | 370/231 |
| 2009/0144589 A1 * | 6/2009 | Shasha et al. | 714/56 |

OTHER PUBLICATIONS

Xiaogang, Yang et al., "Congestion Control Based on Priority Drop for H.264/SVC," 2007 International Conference on Multimedia and Ubiquitous Engineering, 2007, IEEE (5 pages).
LAN/MAN Standards Committee, "IEEE Standard for Local and Metropolitan Area Networks: Virtual Bridged Local Area Networks" (sections 10-14 and Appendices A-F excepted), May 19, 2006, IEEE (103 pages).
Intel Corporation, "Intel(TM) 82756 Gigabit Ethernet Controller" (on-line), (downloaded from http://download.intel.com/design/network/ProdBrf/320025.pdf), 2008 (downloaded on Sep. 28, 2011), Intel Corporation (4 pages).
Wikipedia, "Protocol Stack" (on-line), (retrieved on Dec. 6, 2011), (retrieved from en.wikipedia.org/wiki/Protocol_stack) (3 pages).
Wikipedia, "IEEE 802.1p" (on-line), (retrieved on Dec. 7, 2011), (retrieved from en.wikipedia.org/wiki/IEEE_P802.1p) (2 pages).

* cited by examiner

*Primary Examiner* — Duyen Doan
(74) *Attorney, Agent, or Firm* — James L. Baudino (57) ABSTRACT

Various systems, processes, and products may be used to manage the transmission and reception of messages. In particular implementations, a system, process, and product for managing message transmission and reception may include the ability to receive a plurality of messages to be transmitted over a communication network, wherein some of the messages have a higher priority and some of the messages have a lower priority, and enqueue descriptors for the messages in a direct memory access queue. The system, process, and product may also include the ability to determine whether an overrun of the queue has occurred, analyze the queue if an overrun has occurred to determine if lower priority messages are associated with any of the descriptors in the queue, and replace, if descriptors for lower priority messages are in the queue, the descriptors for the lower priority messages with descriptors for higher priority messages.

20 Claims, 6 Drawing Sheets

MANAGING MESSAGE TRANSMISSION AND RECEPTION

BACKGROUND

The present invention relates to computer systems, and more particular to messaging by computer systems.

To date, most, if not all, network prioritization and congestion solutions (such as IEEE 802.1p, IEEE 802.1Q, TCP congestion avoidance, IP ECN, etc.) focus on preventing stagnation and loss in the cloud. For example, there exists a mechanism for selective dropping per priority as a part of IEEE 802.1Q and Qbb, which defines the mechanism when packets are on a network. Packets may, for example, be dropped at a router when the router has too many packets to route.

BRIEF SUMMARY

In some implementations, a process for managing the transmission and reception of messages may include receiving a plurality of messages to be transmitted over a communication network, wherein some of the messages have a higher priority and some of the messages have a lower priority, enqueuing descriptors for the messages in a direct memory access queue, and determining whether an overrun of the direct memory access queue has occurred. The process may also include analyzing the direct memory access queue if an overrun has occurred to determine if lower priority messages are associated with any of the descriptors in the queue and replacing, if descriptors for lower priority messages are in the queue, the descriptors for the lower priority messages with descriptors for higher priority messages.

The details and features of various implementations will be conveyed by the following description, along with the drawings.

DETAILED DESCRIPTION

Message transmission and reception may be managed by various techniques. In particular implementations, the priority of messages associated with a direct memory access queue may be analyzed during a queue overrun to determine if any messages may be removed from the queue. If lower priority messages are associated with the queue, these associations with the queue may be replaced by associations with higher priority messages. Among other things, this may allow higher priority messages to continue being transmitted during congested periods and reduce loading on the transmitting system.

As will be appreciated by one skilled in the art, aspects of the present disclosure may be implemented as a system, method, or computer program product. Accordingly, aspects of the present disclosure may take the form of an entirely hardware environment, an entirely software embodiment (including firmware, resident software, micro-code, etc.), or an implementation combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be a tangible medium that can contain or store a program for use by or in connection with an instruction execution system, apparatus, or device.

A computer readable signal medium may include a propagated data signal with computer readable program code embodied therein, for example in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any medium, including but not limited to wireless, wireline, optical fiber cable, RF, etc. or any suitable combination of the foregoing.

Computer program code for carrying out operations for aspects of the disclosure may be written in any combination of one or more programming languages such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems), and computer program products according to implementations. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart and/or block diagram block or blocks.

Figure 1:
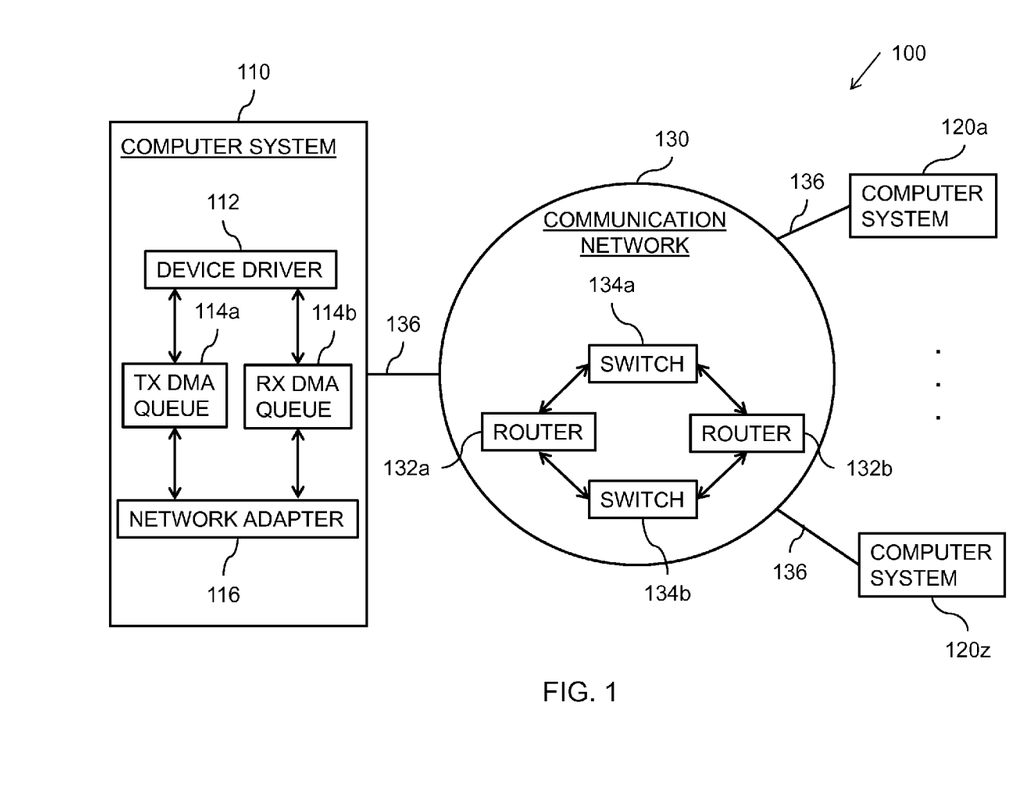
FIG. 1 is a block diagram illustrating an example system in which message transmission and reception may be managed.

FIG. 1 illustrates an example system 100 in which message transmission and reception may be managed. System 100 includes a computer system 110 that communicates with computer systems 120 through a communication network 130.

Computer system 110 may generally be any type of logically operating system (e.g., a personal computer or a server) that desires to communicate with other computer systems. In particular implementations, computer system 110 may run a number of applications that communicate with different ones of computer systems 120. The applications may, for example, be software.

Among other things, computer system 110 includes a device driver 112, direct memory access (DMA) queues 114, and a network adapter 116. Computer system 110 would also typically include one or more processors (e.g., a microprocessor) and one or more memories (e.g., RAM, ROM, disk, etc.). Device driver 112 is a specialized application that prepares messages for communication through network adapter 116 and prepares messages received from the network for applications. As part of its operations, device driver 112 may receive messages for transmission, place the messages in buffers in computer system memory, and assign descriptors for the messages to transmit DMA queue 114a, which may be in computer system memory. The descriptors may store information about the message, such as, for example, protocol (e.g., IPV4, UDP, etc.), length, and control bits for hardware features (e.g., checksum offload), and information about the buffers, such as, for example, address of the buffer in host memory, length of the buffer, and status/command information of the buffer. Network adapter 116 is a hardware device for placing messages on an actual physical link and receiving messages from the physical link. Network adapter 116 may, for example, be a network interface card. Receive DMA queue 114b contains a number of descriptors for network adapter 116 to use when a message has been received from communication network 130. In particular implementations, network adapter 116 may also have equivalent on-chip DMA queues in hardware.

Computer systems 120 may generally be any type of logically operating systems (e.g., a personal computer or a server) that desires to communicate with other computer systems. Computer systems 120 may run one or more applications that communicate with different ones of computer systems 120 and computer system 110.

Computer system 110 and computer systems 120 are communicatively coupled to each other through communication network 130. Communication network 130 may, for example, be a local area network, a wide area network, or the Internet. In the illustrated implementation, communication network 130 includes a number of routers 132 and switches 134 for handling the messages, but this is not required in all implementations. Communication network 130 may use any of a variety of protocols (e.g., TCP/IP or UDP) for conveying messages.

Computer system 110 and computer systems 120 are coupled to communication network 130 through communication links 136. Communication links 136 may include one or more wireline (e.g., cable or fiber optic) and/or wireless links (e.g., radio frequency).

In certain modes or operation, a message, which may, for example, be a packet, is delivered to device driver 112, which interfaces with network adapter 116 for transmission. Device driver 112 then assembles each message into a message buffer in computer system memory and writes information about the message buffer into transmit DMA queue 114a. To transmit a message, network adapter 116 may read a descriptor from transmit DMA queue 114a and retrieve the message from computer system memory using DMA techniques. The network adapter may then send the message to communication network 130.

In the receive path, as a message arrives in hardware, network adapter 116 finds a descriptor in receive DMA queue 114b, places the message in computer system memory at the address in the descriptor using DMA techniques, updates the DMA queue, and interrupts device driver 112. Device driver 112 consumes the message by reading the message in the descriptor. Device driver 112 then passes on the read message (e.g., to an application).

During some portions of operation of computer system 110, overflows of DMA queues 114 may occur. When this occurs in the transmit direction, device driver 112 is no longer able to enqueue descriptors because transmit DMA queue 114a is full, which may result in messages being dropped or queued up for a later transmission attempt (e.g., by software queueing). This type of overflow may, for example, occur when network adapter 116 is not consuming messages as fast as device driver 112 is queuing them. This is often referred to as a transmit first-in-first-out (TX FIFO) overrun. In the receive direction, an overflow may occur because device driver 112 is not reading the descriptors fast enough from receive DMA queue 114b. This may result in the network adapter 116 being unable to DMA a message to computer system memory and the message being dropped. This is often referred to as a receive first-in-first-out (RX FIFO) overrun. In certain implementations, network adapter 116 may have memory available for holding messages and, thus, may be able to store them for a time, but this memory is often of limited amount and, hence, may be quickly depleted.

Although dropped messages may be retransmitted by the host application, dropping messages or delaying messages can have several negative impacts. For example, for time-sensitive applications, dropped or delayed messages can result in necessary information not reaching its destination at the appropriate time. Additionally, retransmitting messages consumes significantly more resources than a simple message transmission due to the transmitting system and the receiving system having to coordinate to have the message retransmitted. And this is a compounding problem if computer system 110 is already experiencing DMA queue overruns.

In some modes of operation, messages may be classified as having higher and lower priorities. Then, when a transmit overrun occurs, device driver 112 may examine transmit DMA queue 114a to determine if any lower priority messages are associated with descriptors in the queue. If any descriptors associated with lower priority messages are in the queue, device driver 112 may remove those descriptors from the queue (e.g., flush them) and replace them with descriptors associated with higher priority messages. Device driver 112 may, for example, use a handler routine to perform these functions. Additionally, when a receive overrun occurs, network adapter 116 may examine receive DMA queue 114b to determine if it has any descriptors associated with any lower priority messages. If any descriptors associated with lower priority messages are in queue 114b, network adapter 116 may remove those descriptors from the queue and replace them with descriptors associated with higher priority messages.

System 100 provides a variety of features. For example, under current implementations, there is no way to differentiate between priority levels for messages having descriptors in a DMA queue. Thus, once overrun conditions start, messages are dropped or delayed without regard to the content of the messages. System 100, however, may allow message priority to be identified in case of an overrun condition. Additionally, system 100 may allow selective dropping or delaying of messages based on priority before the messages are even put on the network. For example, system 100 may allow for a flush of the descriptors associated with low priority messages and replacement with descriptors associated with higher priority messages. This may allow higher priority workloads to continue sending messages during heavy loading conditions, which may prevent them from failing or facing serious performance issues. This technique is available for both transmit and receive paths and can be implemented on the software level.

This technique may also alleviate further loading as message recovery operations (e.g., retransmission) may be reduced. For example, retransmissions congest the communicating hosts (e.g., by requiring more DMA operations) and dirty the network with both out-of-order and duplicate messages. Additionally, without this technique, lower priority packets may continue to be pushed on network under congested traffic or overrun conditions. Thus, these adverse effects significantly hinder end-to-end network performance, especially for streaming connections. System 100 may reduce these congestive effects and promote a healthy network.

Figure 2:
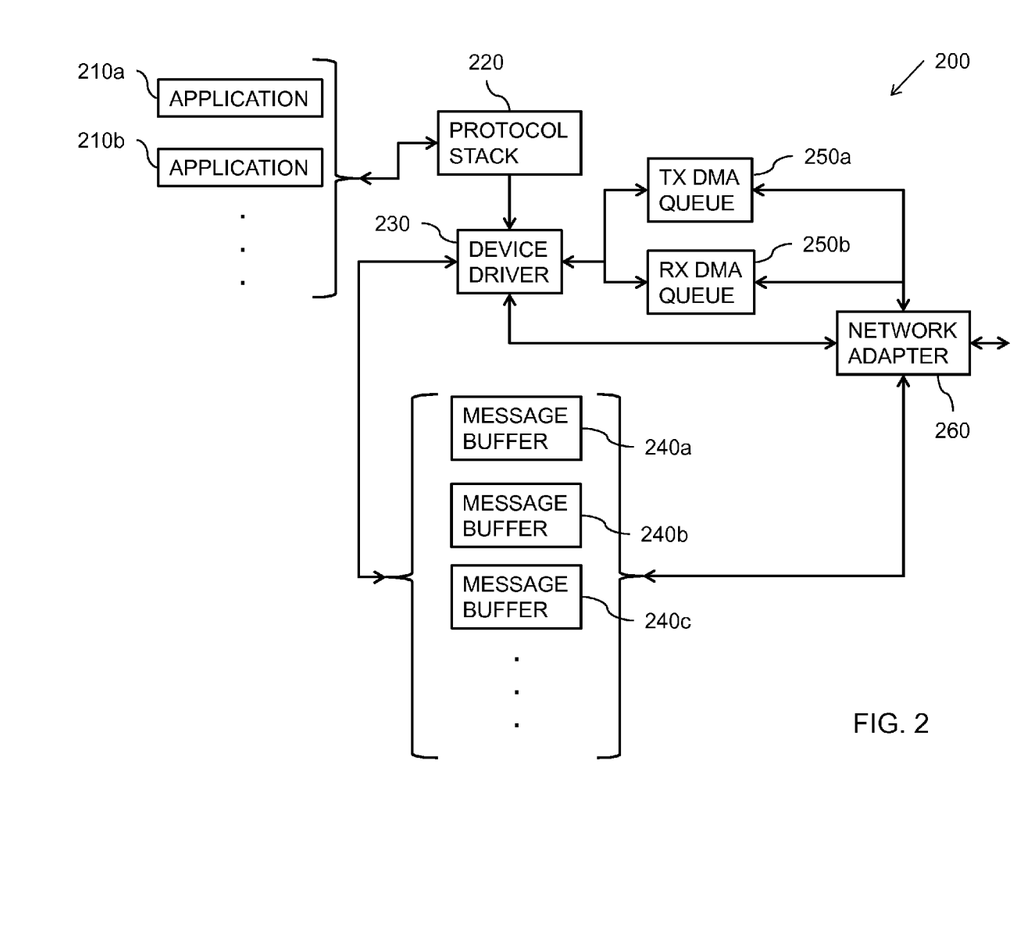
FIG. 2 is a block diagram illustrating an example configuration of a computer system for managing message transmission and reception.

FIG. 2 illustrates a computer system configuration 200 for managing message transmission and reception. Configuration 200 may, for example, illustrate a configuration for computer system 110 of system 100.

Configuration 200 includes a number of applications 210 that require communication with external computer systems. Applications may, for example, require communications based on their programming and/or based on inputs from users. Two or more of applications 210 may be operating at the same time and have different priorities for their messages. For example, one application 210 may be a financial transaction processing application, which has a higher priority for its messages, and another application may be a file serving application, which has a lower priority for its messages. When applications desire to communicate with an external system, they generate a message (e.g., a packet).

Configuration 200 also includes a protocol stack 220. Protocol stack 220 is basically a software implementation of a computer networking protocol suite. Individual protocols within the suite are typically narrowly focused and communicate with a protocol directly above and directly below them, and the protocol stack brings the various modules together. The lowest protocol deals with low-level, physical interaction of the hardware, and every higher layer adds more features. User applications typically deal only with the topmost layers. An example of the layers is shown in Table 1. A protocol stack could also be implemented according to the Open Systems Interconnection (OSI) model from the International Organization for Standardization.

TABLE 1

| Protocol | Layer |
| --- | --- |
| HTTP | Application |
| TCP | Transport |
| IP | Internet |
| Ethernet | Link |
| IEEE 802.3 | Physical |

A protocol stack is often divided into three major sections: media, transport, and applications, and a particular operating system or platform will often have two well-defined software interfaces: one between the media and transport layers, and one between the transport layers and applications. The media-to-transport interface may define how transport protocol software makes use of particular media and hardware types ("card drivers"). For example, this interface level may define how TCP/IP transport software would talk to Ethernet hardware. The application-to-transport interface may define how application programs make use of the transport layers. For example, this interface level may define how a Web browser application would talk to TCP/IP transport software.

Configuration 200 also includes a device driver 230. Device driver 230 is responsible for interfacing between software components and hardware components for communicating messages. For example, device driver 230 interfaces with network adapter 260 for transmitting and receiving messages for applications 210. In certain implementations, device driver 230 may be at the bottom of protocol stack 220.

Configuration 200 further includes a number of message buffers 240. Message buffers exist in the memory (e.g., RAM) of the host computer system and store the messages after they have been processed through 220 protocol stack and device driver 230.

Figure 3:
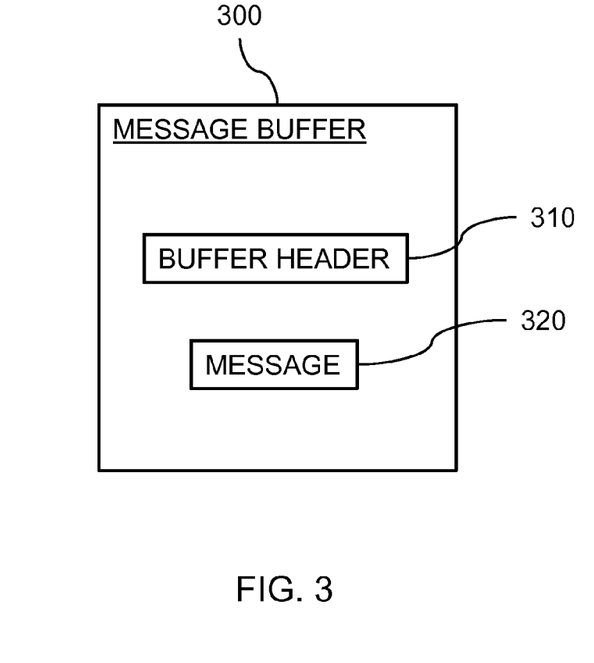
FIG. 3 is a line drawing illustrating an example message buffer.

FIG. 3 illustrates an example message buffer 300. As can be seen, message buffer 300 includes a buffer header 310 and a message 320. Buffer header 310 may, for example, include meta-data about the message, such as, for example, packet lengths, types of protocols in the packet, fragmentation data, and offload technologies requested/required. In particular implementations, message buffer may be an mbuf. Message 320 is the message produced by protocol stack 220 in the transmit direction. An mbuf may, for example, be used to pass a message up the protocol stack from the device driver.

Returning to FIG. 2, configuration 200 also includes a transmit DMA queue 250a and a receive DMA queue 250b. Transmit DMA queue 250a is responsible for holding descriptors for message buffers 240 storing messages that are to be transmitted. The descriptors may, for example, store information about the message buffers such as address of the buffer in host memory, length of the buffer, and status/command information of the buffer. Receive DMA queue 250b is responsible for holding descriptors for message buffers 240 storing messages that are being received.

Figure 4:
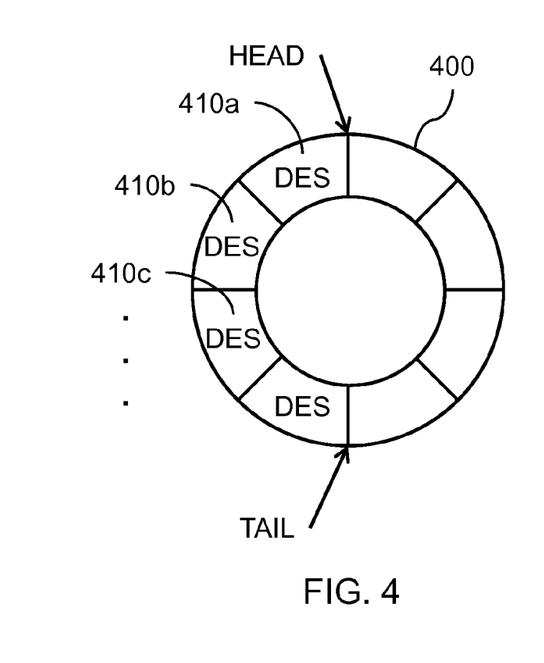
FIG. 4 is a line drawing illustrating an example direct memory access queue.

FIG. 4 illustrates an example message DMA queue 400. In this example, DMA queue 400 is a descriptor ring that has a number of slots 410 for holding descriptors. Additionally, one of the slots holding a descriptor is designated as the head, which means that it holds the next message to be processed, and one of the slots holding a descriptor is designated as the tail, which means that it holds the last current message to be processed. The descriptors between head and tail are valid.

When a new descriptor is added to queue 400, it is placed in the next open slot beyond the tail, and the tail pointer is incremented to the entry beyond the last valid descriptor. When a message is consumed based on queue 400, the head pointer is decrements. The validity of descriptors in queue 400 may be determined via their position in the queue or by a validity indicator (e.g., a bit) located in the descriptor itself. For example, the device driver may set a bit to one to indicate to the network adapter that it should consume the descriptor, and the network adapter may set the bit back to zero to indicate that it has consumed the descriptor. When the head pointer is equal to the tail pointer, queue 400 is empty. When the head pointer is next to the tail, the queue is full, and no new descriptors may be added until a descriptor is consumed. At this point, overflows may begin occurring.

Returning to FIG. 2, configuration 200 also includes a network adapter 260. Network adapter is a hardware device that is responsible for transmitting messages in message buffers 240 to a communication network according to transmit DMA queue 250a. Network adapter 260 also receives messages from the communication network and places them into message buffers according to receive DMA queue 250b.

In certain modes of operation, when one of applications 210 wants to send a message, it sends a message, which may be part of the message, for transmission to protocol stack 220. The message traverses protocol stack 220, where it may, for example, be made ready for transmission by being encapsulated multiple times, and is delivered to device driver 230. The driver assembles the message in a message buffer chain and stores (e.g., writes) information regarding the message (e.g., a descriptor) in transmit DMA queue 250a. In particular implementations, network adapter 260 will also have an equivalent on-chip DMA queue in hardware. Network adapter 260 sends a message by reading the earliest descriptors in transmit DMA queue 250a. Device driver 230 stops adding new descriptors to the transmit DMA queue when it is full.

In the receive path, device driver 230 adds descriptors with valid host memory addresses (for network adapter to DMA transfer) to receive DMA queue 250b. As messages arrive in hardware, network adapter 260 picks up an available descriptor from receive DMA queue 250b and places the message in host computer memory at the address in the descriptor using DMA techniques. The message may, for example, be placed in a pre-mapped buffer that has a pre-initialized header associated with it. Network adapter 260 then updates the pointers for the queue and interrupts device driver 230. Device driver 230 processes the messages by reading a message associated with a descriptor. The device driver may, for example, populate any additional fields in an mbuf header before handing the packet off to the protocol stack. Device driver 230 then passes on the read message to protocol stack 220 (e.g., through a demuxer). Network adapter 260 stops adding new descriptors to receive DMA queue 250b when the queue is full.

There are a number of interrupts supported by network adapters to indicate when an overrun of a DMA queue exists. Device driver 230 may register for these errors and, thus, be informed when an overrun condition occurs.

When an overrun of transmit DMA queue 250a occurs, device driver 230 may begin dropping or delaying messages. Additionally, device driver 230 may check to see whether messages of varying priority have descriptors in transmit DMA queue 250a.

To determine whether there are messages of varying priority in queue 250a, device driver 230 may, for example, analyze the message buffers 240 associated with descriptors in the queue. Priority indicators could be placed in messages in a number of manners. For example, a user may specify the priority of messages for an application (e.g., high versus low, high versus medium versus low, etc.). Thus, users may dictate priority based handling for their workloads. As another example, the messages may be tagged in protocol stack 220. For instance, in IEEE 802.1Q, messages may be tagged based on which virtual LAN (VLAN) they are associated with. A VLAN interface may be associated with each set of message in the protocol stack (e.g., above device driver 230) and place the priority indicator in the messages. The network addresses assigned for the application may determine to which VLAN a message belongs. Device driver 230 may then extrapolate the VLAN tags and determine priority. As a further example, an application 210 may open up a socket (e.g., an application programming interface (API)) to send data, and the socket may be used to determine the priority of the messages. Protocol stack 220 can store this priority in header options (such as message header options), which may be set in all the messages being sent to the device driver.

As indicated previously, the priority indicator for a message may be put in a number of places. For example, the priority may be stored in the messages. For instance, the priority may be placed in the header of a message. As another example, the priority may be placed in the header for the message buffer 240.

In certain implementations, priority indicators could be placed in the descriptors. For example, in VLAN tag offload, VLAN information can be specified in the descriptor, and the network adapter can manage the tag insertion. Furthermore, the inverse of such a feature—VLAN tag extraction—can be performed on received packets. This could be configured during the initialization of the network adapter/DMA queue. Thus, the priority information could be located in the VLAN tags.

Additionally, in certain implementations, device driver 230 may have assigned message buffers 240 to different queues depending on their priority status. For example, one queue may be for higher priority messages and another queue may be for lower priority messages, although any number of queues may be used as the priority status of messages may have varying degrees (e.g., 1-15). Thus, by analyzing which queue the messages are from, device driver 230 may be able to determine the priority of the messages associated with transmit DMA queue 250a.

In the multiple queue implementations, device driver 230 may maintain attributes indicating threshold values for handling both the queues during non-congested operations to maintain uniform handling of both the queues. For example, an attribute that designates the minimum messages to be handled from the higher priority queue before switching over to lower priority queue may be defined (e.g., highPriMinPkt).

Additionally, another attribute that designates the maximum number of messages to be processed in the low priority queue before going back to the high priority queue may be defined (e.g., lowPriMaxPkt). These attributes can be controlled by the user.

Upon reception of messages in the transmission path, device driver 230 may enqueue messages in either high priority or low priority queue. This may, for example, be accomplished based on buffer options set by protocol stack 220. The processing of the two queues will depend upon the two attributes (e.g., highPriMinPkt and lowPriMaxPkttt) stated above and will be used until an overrun condition for transmit DMA queue 250*a* occurs.

If applications 210 have a mix of higher priority and lower priority messages and transmit DMA queue 250*a* contains descriptors pointing to lower priority messages, device driver 230 may stop the transmission engine in network adapter 260 (e.g., to prevent any serialization issues) and then flush all the descriptors associated with lower priority messages for queue 250*a* and replace them with descriptors associated with higher priority messages. The messages associated with the flushed descriptors may, for example, be deleted or requeued at a later time. Device driver 230 may then restart the transmission engine in the network adapter. Thus, higher priority messages may receive preferred treatment during heavy workloads. If transmit DMA queue 250*a* has no descriptors associated with lower priority messages, device driver 230 may return since nothing can be flushed out.

When an overrun of receive DMA queue 250*b* occurs (e.g., because the network adapter is unable to DMA a message due to receive DMA queue 250*b* being full), network adapter 260 may begin dropping messages. Additionally, network adapter 260 may check to see whether messages of varying priority have descriptors in receive DMA queue 250*b*.

If receive DMA queue 250*b* contains descriptors associated with lower priority messages, network adapter 260 may flush the descriptors associated with lower priority messages and replace them with descriptors associated with higher priority messages. Note that the flushing of the descriptors may have to be serialized with the receipt of incoming packets (e.g., by stopping a receive engine) and synchronized with device driver 230 (e.g., to ensure that the network adapter and the device driver observe the same, updated memory state). Thus, higher priority messages may receive preferred treatment during heavy workloads. If receive DMA queue 250*b* has no descriptors associated with lower priority messages, network adapter 260 returns since nothing can be flushed out.

Network adapter 260 may determine the priority of messages in a variety of ways. For example, network adapter 260 may inspect the messages to determine a priority indicator. As another example, network adapter 260 may prioritize the messages based on message type (e.g., IPv4 versus IPv6 versus UDP versus TCP).

In particular implementations, an additional attribute (e.g., flush OK) could be used to indicate if descriptors corresponding to a workload may be flushed by higher priority workloads during congestion to accommodate descriptors of higher priority workloads. The workload priority and flush OK attributes can be marked in the buffer options field by protocol stack 220 while delivering the message to device driver 230.

When a transmit DMA overrun condition occurs, device driver 230 will get a notification from network adapter 260 (e.g., in the form of a TX overrun interrupt), after which the device driver can look into workload priority indicators associated with the descriptors. If descriptors associated with lower priority messages are present and flush is allowed, device driver 230 can flush these descriptors from transmit DMA queue 250*a* and replace them with descriptors pointing to buffers associated with higher priority messages so that network adapter 260 can use and prevent the higher priority workloads from failing or dropping messages. But if the flush indicator indicates that flushing is not allowed for a message, the descriptor cannot be flushed.

In case of the receive path, network adapter 260 can do similar processing as done by device driver 230 in the transmit path. For example, the network adapter may identify descriptors associated with lower priority workloads and discard them during congestion so that receive DMA queue 250*b* is not depleted with descriptors of lower priority messages.

In certain implementations, a flow control may inform the host computer system to slow down the rate at which it is producing messages. This may, for example, be accomplished with a pause frame. However, this is only a temporary solution and congestion may still result. Moreover, a pause does not address the priority aspect for messages already queued.

Although FIG. 2 illustrates one computer system configuration for managing message transmission and reception. Other configurations may include fewer, additional, and/or a different arrangement of components. For example, a number of applications are not required. For instance, one application could be sending messages that have different priorities. As one example, an application could have "keep alive" heartbeat messages and regular data messages, and if the heartbeat messages do not reach the receiver, the receiver may determine that the sending application has ceased communicating with it. Thus, the heartbeat messages could benefit from being treated with a higher priority. Additionally, a kernel could be generating messages that have priorities. As another example, there could be additional DMA queues.

Figure 5:
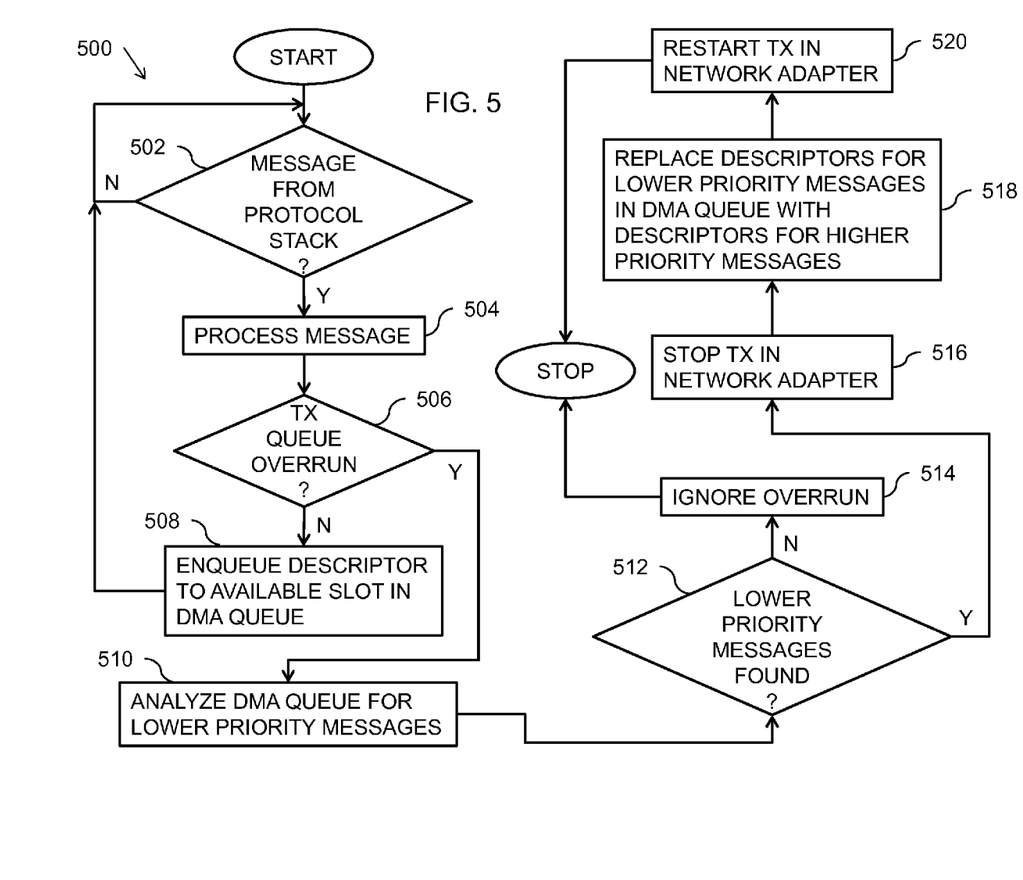
FIG. 5 is flowchart illustrating an example process for managing message transmission.

FIG. 5 illustrates a process 500 for managing message transmission. Process 500 may, for example, be performed by a device driver.

Process 500 calls for determining whether a message from a protocol stack has been received (operation 502). If a message from a protocol stack has not been received, process 500 calls for waiting for a message from the protocol stack.

Once a message from a protocol stack has been received, process 500 calls for processing the message (operation 504). Processing the message may, for example, include placing the message in a buffer and attaching a buffer header. Process 500 also calls for determining whether an overrun has occurred for a transmit DMA queue (operation 506). Determining whether an overrun has occurred may, for example, be accomplished by recognizing an interrupt from a network adapter. If an overrun has not occurred, process 500 calls for enqueing a descriptor for the message to an available slot in the DMA queue (operation 508) and returning to wait for another message from the protocol stack (operation 502).

If, however, an overrun of the DMA queue has occurred, process 500 calls for analyzing the DMA queue to determine whether any descriptors associated with lower priority messages are present (operation 510). Determining whether descriptors associated with lower priority messages may, for example, be determined by examining the descriptors themselves, the location at which the associated messages are stored (e.g., in a particular queue), or analyzing the associated messages.

Process 500 also calls for determining whether lower priority messages are associated with one or more descriptors in the DMA queue (operation 512). If lower priority messages are not associated with one or more descriptors, process 500 calls for ignoring the overrun. Process 500 is then at an end.

If, however, lower priority messages are associated with one or more descriptors, process 500 calls for stopping the transmission engine in the associated network adapter (operation 516) and replacing descriptors associated with lower priority messages with descriptors associated with higher priority messages (operation 518). Process 500 also calls for restarting the transmission engine in the network adapter (operation 520). Process 500 is then at an end.

Process 500 may be run a number of times during the operation of a computer system. For example, once a computer system resumes uncongested operation, process 500 may be restarted.

Although FIG. 5 illustrates a process for managing message transmission, other processes for managing message transmission may include fewer, additional, and/or a different arrangement or operations. For example, a process may include receiving a message from an application as opposed to a protocol stack. As another example, a process may include determining whether descriptors associated with higher priority messages are available for replacing the descriptors associated with the lower priority messages. As a further example, a process may include determining whether lower priority messages may be flushed (e.g., by examining a flush OK indicator).

Figure 6:
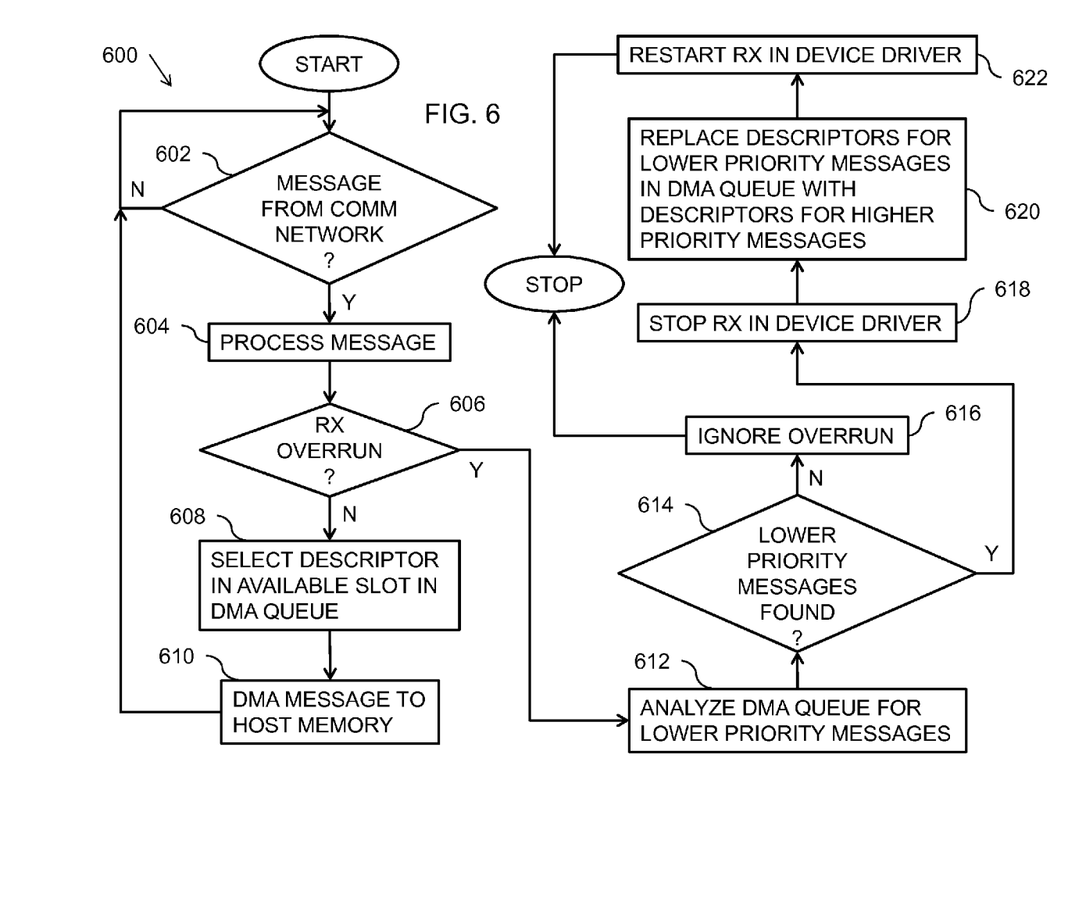
FIG. 6 is a flowchart illustrating an example process for managing message reception.

FIG. 6 illustrates an example process 600 for managing message receipt. Process 600 may, for example, be performed by a network adapter.

Process 600 calls for determining whether a message from a communication network has been received (operation 602). If a message from a communication network has not been received, process 600 calls for waiting for a message from a communication network.

Once a message from a communication network has been received, process 600 calls for processing the message (operation 604). Processing the message may, for example, include determining if the message should be received or not. For instance, the message may be checked regarding whether it is in a unicast format and destined for the system. As another example, the message may be checked regarding whether it is a broadcast message or a multicast message and whether there is room in memory to store the message and room in DMA to place the message.

Process 600 also calls for determining whether an overrun has occurred for a receive DMA queue (operation 606). Determining whether an overrun has occurred may, for example, be accomplished by analyzing the DMA queue to determine whether it is full and determining whether too many additional messages are waiting to have their descriptors placed in the DMA queue.

If an overrun has not occurred, process 600 calls for selecting a descriptor for the message in an available slot in the DMA queue (operation 608) and transferring the message into host memory using DMA techniques (operation 610). Process 600 then calls for returning to wait for another message from the communication network (operation 602).

If, however, an overrun of the DMA queue has occurred, process 600 calls for analyzing the DMA queue to determine whether any descriptors associated with lower priority messages are present (operation 612). Determining whether descriptors associated with lower priority messages are present in the DMA queue may, for example, be determined by examining the descriptors themselves or analyzing the associated messages.

Process 600 also calls for determining whether lower priority messages are associated with one or more descriptors in the DMA queue (operation 614). If lower priority messages are not associated with one or more descriptors, process 600 calls for ignoring the overrun. Process 600 is then at an end.

If, however, lower priority messages are associated with one or more descriptors, process 600 calls for stopping the receive engine in an associated device driver (operation 618) and replacing queued descriptors associated with lower priority messages with descriptors associated with higher priority messages (operation 620). Process 600 also calls for restarting the receive engine in the device driver (operation 622). Process 600 is then at an end.

Process 600 may be run a number of times during the operation of a computer system. For example, once a computer system resumes uncongested operation, process 600 may be restarted. Additionally, process 600 may be used in conjunction with process 500.

Although FIG. 6 illustrates a process for managing message receipt, other processes for managing message reception may include fewer, additional, and/or a different arrangement or operations. For example, a process may include determining whether descriptors associated with higher priority messages are available for replacing the descriptors associated with the lower priority messages. As another, a process may include determining whether lower priority messages may be flushed (e.g., by examining a flush OK indicator). As a further example, a process may include serializing the device driver's receive processing engine and network adapter components dealing with the receive DMA memory queue during a descriptor replacement, as the network adapter will be making changes to the shared memory region. Additionally, descriptor flushing may involve a synchronization operation to ensure that both sides (e.g., the device driver running on the host and the network adapter itself) see the same, updated memory state.

The flowchart and block diagrams in the figures illustrate the architecture, functionality, and operation of systems, methods, and computer program products of various implementations of the disclosure. In this regard, each block in the flowchart or block diagrams may represent a module, segment, or portion of code, which can include one or more executable instructions for implementing the specified logical function(s). It should also be noted that, in some alterative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or the flowchart illustration, and combination of blocks in the block diagrams and/or flowchart illustration, can be implemented by special purpose hardware-based systems that perform the specified function or acts, or combinations of special purpose hardware and computer instructions.

Figure 7:
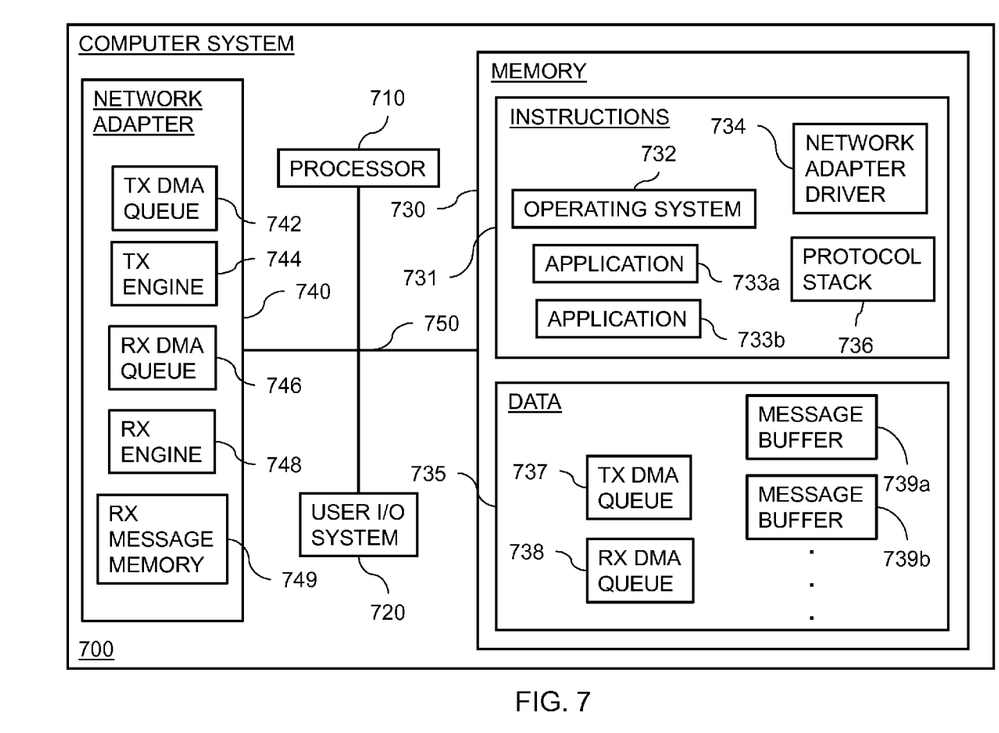
FIG. 7 is a block diagram illustrating an example computer system for managing message transmission and reception.

FIG. 7 illustrates an example computer system 700 for managing the transmission and receipt of messages. Computer system 700 includes a processor 710, a user input/output system 720, memory 730, and a network adapter 740, which are coupled together by a network 750. Computer system 700 may, for example, be similar to computer system 110 in system 100. Computer system 700 is only one example of a suitable computer system, however, and is not intended to suggest any limitation as to the scope of use or functionality of other implementations described herein. Regardless, computer system 700 is capable of being implemented and/or performing any of the functionality set forth hereinabove.

Processor 710 typically includes a logical processing unit (e.g., an arithmetic logic unit) that processes data under the direction of program instructions (e.g., from software). For example, processor 710 may be a microprocessor, a microcontroller, or an application specific integrated circuit. The processor may operate by reduced instruction set computer (RISC) or complex instruction set computer (CISC) principles. In general, the processor may be any device that manipulates data in a logical manner.

User input/output system 720 may include one or more user interfaces. A user interface could, for instance, be a user input device (e.g., a keyboard, a keypad, a touchpad, a stylus, a mouse, or a microphone) or a user output device (e.g., a monitor, a display, or a speaker). In general, input/output system 720 may be any combination of devices by which a computer system can receive and output data.

Memory 730 may, for example, include random access memory (RAM), read-only memory (ROM), flash memory, and/or disc memory. Various items may be stored in different portions of the memory at various times. Memory 730, in general, may be any combination of devices for storing data.

Memory 730 includes instructions 731 and data 736. Instructions 731 include an operating system 732 (e.g., Windows, Linux, or Unix) one or more applications 733, a driver 734 for network adapter 740, and a protocol stack 735. Data 736 includes the data required for and/or produced by applications 733, network adapter driver 734, and protocol stack 735, including a transmit DMA queue 736, a receive DMA queue 738, and message buffers 739.

Network adapter 740 includes, among other things, a transmit DMA queue 742, a transmit engine 744, a receive DMA queue 746, a receive engine 748, and receive message memory 749. Transmit DMA queue 742 and receive DMA queue 746 may be in hardware. Transmit DMA queue 742 corresponds to transmit DMA queue 737, and receive DMA queue corresponds to receive DMA queue 738. Thus, an instance of each DMA queue exists in host computer system memory 730 and on network adapter 740. Transmit engine 744 is responsible for reading messages from message buffers 739 according to transmit DMA queue 737 and sending them into a communication network. Receive engine 748 is responsible for receiving messages from the communication network, place them into receive message memory 749, selecting descriptors from receive DMA queue 746, and performing a DMA transfer of the messages into message buffers 739 according to the selected descriptors.

Network 750 is responsible for communicating data between processor 710, user input/output system 720, memory 730, and network adapter 740. Network 750 may, for example, include a number of different types of busses (e.g., serial and parallel).

In certain modes of operation, processor 710 is able to generate a message when one of applications 733 needs to send a message and send the message through protocol stack 735. After the message traverses protocol stack 735, processor 710, according to network adapter driver 734, assembles the message in a message buffer chain, stores (e.g., writes) information regarding the message (e.g., a descriptor) into TX DMA queue 737, and places the message in a message buffer 739.

As mentioned previously, network adapter 740 has an equivalent transmit DMA queue 742. The network adapter consumes a descriptor by reading the earliest descriptor in transmit DMA queue 742 and retrieving the message through DMA operations. Network adapter 740 may then place the message into a communication network.

In the receive path, processor 710, according to device driver 230 adds descriptors with valid host memory addresses (for network adapter to DMA transfer) to receive DMA queue 738, which is replicated on network adapter as receive DMA queue 746. As messages arrive at network adapter 740, network adapter 740 picks up an available descriptor from receive DMA queue 746 and places the messages in message buffers 739 at the addresses in the descriptors using DMA techniques. Network adapter 740 then updates the pointers for the receive DMA queue and sends an interrupt to device driver 734.

Processor 710 receives the interrupt and, according to device driver 734, consumes the message by reading it based on the associated descriptor. Processor 710 then passes the message through protocol stack 736. Processor 710 may then provide the message to one of applications 733.

When an overrun of transmit DMA queue 737 occurs, network adapter 740 may notify processor 710 (e.g., through an interrupt), and processor 710, according to network adapter driver 734, may begin dropping or delaying messages. Also pursuant to device network adapter driver 734, processor 710 may check to see whether messages of varying priority have descriptors in transmit DMA queue 737. To determine whether there are descriptors associated with messages of varying priority, processor 710 may, for example, analyze the message buffers 739 associated with descriptors in transmit DMA queue 737. As indicated previously, priority indicators could be placed in messages in a number of manners.

If applications 733 have a mix of higher priority and lower priority workloads and transmit DMA queue 737 contains descriptors pointing to lower priority messages, processor 710, according to device driver 734, may stop transmit engine 744 in network adapter 740 (e.g., to prevent any serialization issues) and then flush all the descriptors associated with lower priority messages from the transmit DMA queue and refill the flushed locations with descriptors associated with higher priority messages. Processor 710 may then restart the transmit engine in the network adapter. Thus, higher priority messages may receive preferred treatment during heavy workloads. If transmit DMA queue 737 has no descriptors associated with lower priority messages, processor 710 may ignore the interrupt since there is nothing to flush out.

When an overrun of receive DMA queue 746 occurs (e.g., because the network adapter is unable to DMA a message due to receive DMA queue 746 being full), network adapter 740 may begin dropping messages. Additionally, network adapter 740 may check to see whether messages of varying priority have descriptors in receive DMA queue 746.

If receive DMA queue 746 contains one or more descriptors associated with lower priority messages, network adapter 740 may flush the descriptors associated with lower priority messages from the receive DMA queue and refill the slots with descriptors associated with higher priority messages. Thus, higher priority messages may receive preferred treatment during heavy workloads. If receive DMA queue 746 has no descriptors associated with lower priority messages, network adapter 740 may continue dropping messages.

The terminology used herein is for the purpose of describing particular implementations only and is not intended to be limiting. As used herein, the singular form "a", "an", and "the" are intended to include the plural forms as well, unless the context clearly indicates otherwise. It will be further understood that the terms "comprises" and/or "comprising," when used in the this specification, specify the presence of stated features, integers, steps, operations, elements, and/or components, but do not preclude the presence or addition of one or more other features, integers, steps, operations, elements, components, and/or groups therefore.

The corresponding structure, materials, acts, and equivalents of all means or steps plus function elements in the claims below are intended to include any structure, material, or act for performing the function in combination with other claimed elements as specifically claimed. The description of the present implementations has been presented for purposes of illustration and description, but is not intended to be exhaustive or limited to the implementations in the form disclosed. Many modification and variations will be apparent to those of ordinary skill in the art without departing from the scope and spirit of the disclosure. The implementations were chosen and described in order to explain the principles of the disclosure and the practical application and to enable others or ordinary skill in the art to understand the disclosure for various implementations with various modifications as are suited to the particular use contemplated.

A number of implementations have been described for managing transmission and reception of messages, and several others have been mentioned or suggested. Moreover, those skilled in the art will readily recognize that a variety of additions, deletions, modifications, and substitutions may be made to these implementations while still achieving management of message transmission and reception. Thus, the scope of the protected subject matter should be judged based on the following claims, which may capture one or more concepts of one or more implementations.

The invention claimed is:

1. A method comprising:
receiving a plurality of messages to be transmitted over a communication network, wherein some of the messages have a higher priority and some of the messages have a lower priority;
enqueuing descriptors for the messages in a direct memory access queue;
determining whether an overrun of the direct memory access queue has occurred;
analyzing the direct memory access queue if an overrun has occurred to determine if lower priority messages are associated with any of the descriptors in the queue; and
replacing, if descriptors for lower priority messages are in the queue, the descriptors for the lower priority messages with descriptors for higher priority messages.

2. The method of claim 1, further comprising:
generating a buffer for each message; and
generating a descriptor for each message.

3. The method of claim 1, further comprising enqueuing additional descriptors for higher priority messages and lower priority messages if an overrun for the direct memory access queue has not occurred.

4. The method of claim 1, further comprising dropping messages to be transmitted if descriptors for lower priority messages are not in the queue.

5. The method of claim 1, further comprising:
generating a message to stop transmissions from a network adapter if descriptors are to be replaced in the direct memory access queue; and
generating a message to restart the transmissions from the network adapter once the descriptors have been replaced.

6. The method of claim 1, further comprising:
placing the messages in different queues depending on their priority; and
analyzing the queue location for the messages associated with descriptors in the direct memory access queue to determine if lower priority messages are associated with any of the descriptors in the queue.

7. The method of claim 1, wherein the direct memory access queue comprises a descriptor ring, and operating the ring according to a producer consumer model.

8. The method of claim 1, further comprising:
receiving a plurality of messages from a communication network, wherein some of the messages have a higher priority and some of the messages have a lower priority;
selecting descriptors for the messages in a second direct memory access queue;
determining whether an overrun for the second direct memory access queue has occurred;
analyzing the second direct memory access queue to determine if lower priority messages are associated with any of the descriptors in the queue; and
replacing, if descriptors for lower priority messages are in the queue, the descriptors for the lower priority messages with descriptors for higher priority messages.

9. The method of claim 8, further comprising dropping received messages if descriptors for lower priority messages are not in the queue.

10. A system comprising:
a device driver adapted to:
receive a plurality of messages to be transmitted over a communication network, wherein some of the messages have a higher priority and some of the messages have a lower priority,
enqueue descriptors for the messages in a direct memory access queue,
analyze the direct memory access queue if an overrun of the queue has occurred to determine if lower priority messages are associated with any of the descriptors in the queue, and
replace, if descriptors for lower priority messages are in the queue, the descriptors for the lower priority messages with descriptors for higher priority messages; and
a network adapter adapted to:
send messages into a communication network based on the descriptors, and
determine whether an overrun of the direct memory access queue has occurred and generate an interrupt if an overrun has occurred.

11. The system of claim 10, wherein the device driver is further adapted to:
generate a buffer for each message; and
generate a descriptor for each message.

12. The system of claim 10, wherein the device driver is further adapted to enqueue additional descriptors for higher priority messages and lower priority messages if an overrun of the direct memory access queue has not occurred.

13. The system of claim 10, wherein the device driver is further adapter to drop messages to be transmitted if descriptors for lower priority messages are not in the queue.

14. The system of claim 10, wherein the device driver is further adapted to:
generate a message to stop transmissions from the network adapter if descriptors are to be replaced in the direct memory access queue; and
generate a message to restart the transmissions from the network adapter once the descriptors have been replaced.

15. The system of claim 10, wherein the network adapter is further adapted to:
receive a plurality of messages from a communication network, wherein some of the messages have a higher priority and some of the messages have a lower priority;
select descriptors for the messages in a second direct memory access queue;
determine whether an overrun of the second direct memory access queue has occurred;

analyze the second direct memory access queue if an overrun of the queue has occurred to determine if lower priority messages are associated with any of the descriptors in the queue; and replace, if descriptors for lower priority messages are in the queue, the descriptors for the lower priority messages with descriptors for higher priority messages.

16. A computer program product for managing message transmissions, the computer program product comprising:
a non-transitory computer readable medium;
first program instructions to receive a plurality of messages to be transmitted over a communication network, wherein some of the messages have a higher priority and some of the messages have a lower priority;
second program instructions to enqueue descriptors for the messages in a direct memory access queue;
third program instructions to determine whether an overrun of the direct memory access queue has occurred;
fourth program instructions to analyze the direct memory access queue if an overrun has occurred to determine if lower priority messages are associated with any of the descriptors in the queue; and
fifth program instructions to replace, if descriptors for lower priority messages are in the queue, the descriptors for the lower priority messages with descriptors for higher priority messages; and
wherein said program instructions are stored on said computer readable medium.

17. The computer program product of claim 16, further comprising sixth program instructions to generate a buffer for each message and generate a descriptor for each message.

18. The computer program product of claim 16, further comprising seventh program instructions to enqueue additional descriptors for higher priority messages and lower priority messages if an overrun of the direct memory access queue has not occurred.

19. The computer program product of claim 16, further comprising eighth program instructions to drop messages to be transmitted if descriptors for lower priority messages are not in the queue.

20. The computer program product of claim 16, further comprising ninth program instructions to:
generate a message to stop transmissions from a network adapter if descriptors are to be replaced in the direct memory access queue; and
generate a message to restart the transmissions from the network adapter once the descriptors have been replaced.

* * * * *